Dec. 31, 1963   L. H. RAPER   3,116,173
METHOD OF MANUFACTURE OF DISC TYPE CELL
Filed Dec. 9, 1957

INVENTOR.
L. H. RAPER
BY
ATTYS.

United States Patent Office 3,116,173
Patented Dec. 31, 1963

3,116,173
METHOD OF MANUFACTURE OF DISC TYPE CELL
Lyle H. Raper, Normal, Ill., assignor, by mesne assignments, to the United States of America as represented by the Secretary of the Navy
Filed Dec. 9, 1957, Ser. No. 701,688
1 Claim. (Cl. 136—175)

This application relates to a fuzed electrolyte cell and is more particularly concerned with a pellet type cell for use in a thermo battery or the like and method of making the same.

Cells of the general type disclosed herein are employed as electrochemical power supplies in applications which require a peak voltage over a relatively short period and in which the life of the battery during full load operation may be relatively short and need last but a few minutes but in which the battery must possess an extremely long shelf life and must retain its power over extended storage periods and yet be ready to deliver power when required. This is accomplished by incorporating a potentially heat producing material into the cell so that by triggering this material the solid electrolyte within the cell melts and becomes conducting thereby rendering the cell operative.

One object of this invention is to provide a method of fabricating a plurality of fuzed electrolytic cells which may be stacked to form a thermally actuated battery to provide series or parallel output.

Another object of this invention is to provide a novel pellet cell for use in a thermal battery.

A further object is the provision of a potentially fusible, solid electrolyte cell for incorporation into a thermal battery which cell contains therein a quantity of heat producing material sufficient to fuse the solid electrolyte.

A further object is to provide a method of manufacture for a thermal battery composed of a plurality of fused electrolyte cells.

These and many other objects will become apparent when the following specification is read in conjunction with the appended drawing wherein like numerals denote like parts throughout the several views and in which.

Figure 1:
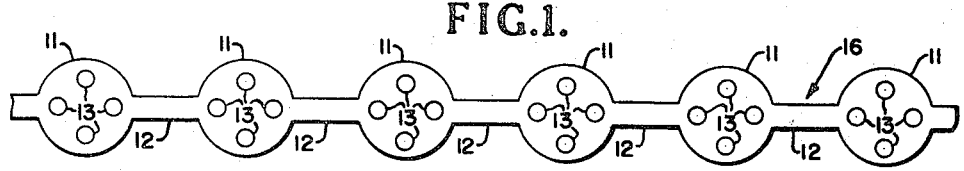
FIG. 1 is a plan view of the punched metal tape or foil upon which the cell of this invention is formed.
Figure 2:
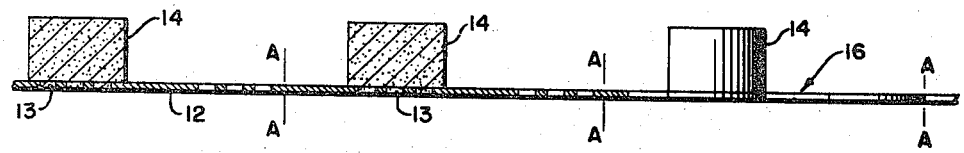
FIG. 2 is a longitudinal section of a strip of these cells during an intermediate step in the process of manufacture.
Figure 3:
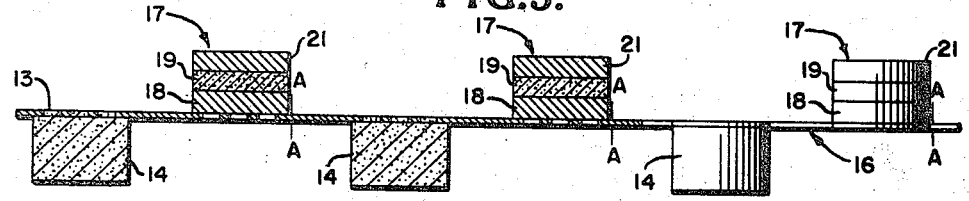
FIG. 3 is a plan view and partially in section of the cells immediately prior to the cutting operation.

By referring to the appropriate figures of the drawing, the stepwise development of the process employed in fabricating the battery will be more readily understood. Initially, a flexible conducting material such as .002″–.005″ strip 16 stainless steel is stamped or otherwise formed into a series of discs 11 interconnected by tabs 12. A plurality of holes 13 are preferably punched in each disc so that the cell and heat producing compacts to be deposited thereon on opposite surfaces of the discs as described hereinafter may be more firmly attached to their respective discs. The foregoing step is optional however and the holes may be omitted if desired. A potentially heat producing compact 14 is then pressed onto the metal strip at alternate discs 11 as shown in FIG. 2. This heat compact is of the type that is triggered by any conventional method. Since the composition of the compact forms no part of this invention and there are many well known heat producing compacts of this type the composition of compact 14 is not discussed in detail herein.

The strip 16 is then inverted or reversed and a series of pellets 17 are deposited and pressed on alternate discs 11, between the disc carrying compact 14 and on the opposite surface of the discs from said compact. The pellets are then pressed onto the disc. The pellets are composed of three layers, the first layer 18 which is pressed powdered magnesium serves as the anode and the second layer 19 is composed of pressed powdered mixture of electrolyte and dehydrated crystalline sheets of kaolin for optimum operation during normal usage. The third or cathode layer 21 is prepared by mixing together a molten mixture of $B_2O_3$ and $V_2O_5$ freezing the mixture, then pulverizing it to form an intimately mixed powder. It is to be understood that the composition of the cell per se forms no part of this invention. These layers are stacked prior to pressing into pellet form so that they intermingle at their boundaries. Accordingly, after pressing at pressures from about 40,000 p.s.i. to 70,000 p.s.i., there are no sharp boundaries between the various layers and consequently intimate contact is assured between the anode and cathode on the ends and the centrally disposed electrolyte. The amount of material in the pellet 17 should be controlled so that the ratio between layers 18, 19 and 21 is 1:2:2, and the total thickness of the cell subassembly is .045 inch to .050 inch. Of course the amount of material necessary to obtain the optimum cell configuration depends to a considerable degree upon the pressure at which the pellet 17 is formed and the amount of material must therefore be correlated with that pressure.

Figure 4:
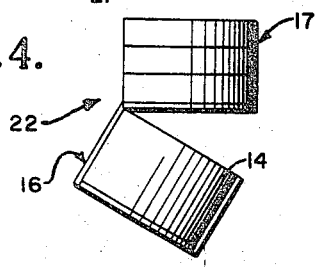
FIG. 4 is a longitudinal section of an individual cell which shows more clearly the assembly of a typical cell.

After the pellet 17 and compact 14 are fixed to their respective discs 11 in the aforedescribed manner, the strip 16 is cut along lines A—A to form a plurality of paired, interconnected discs, one each of the pair containing the compact 14 and the other the pellet 17. The tab 12 is equal in length to the height of the thermal compact 14 and to the pellet 17. The paired discs are then formed into a useable battery subassembly 22 by folding the tab 12 in the manner indicated (FIG. 4) to form a compact receiving portion about compact 14 so that the face of compact 14 abuts the under surface of the disc supporting pellet 17. The tab 12 being of a length equal to the height of the compact 14 permits the tab to fold along the side of the compact and the compact 14 to align with the pellet 17. It should be particularly noted that pellet 17 remains electrically connected to the disc 11 supporting compact 14. A plurality of subassemblies 22 are then stacked in an electrically insulated tube or sleeve 24 to form a battery. By stacking the battery subassemblies in the manner shown in FIG. 5 so that the subassemblies 22 are all oriented similarly they are electrically connected in series. On the other hand, by inverting alternate subassemblies 22 it is possible to connect them in parallel as indicated in FIG. 6.

Figure 5:
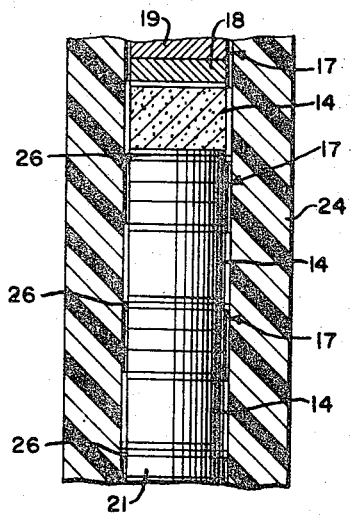
FIG. 5 is a longitudinal section of a thermal battery utilizing a plurality of the cells stacked to provide series electrical output.
Figure 6:
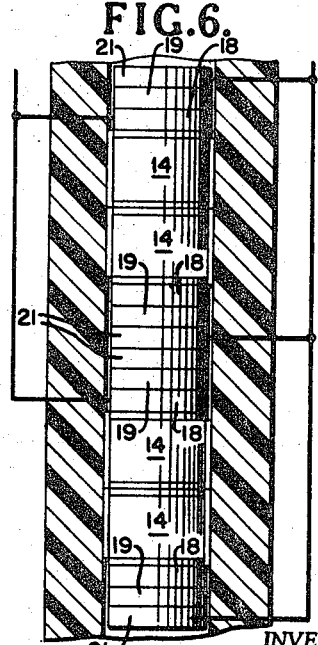
FIG. 6 is a longitudinal section of a battery wherein the individual cells are stacked to provide parallel electric output.

When subassemblies of this type are connected in series by stacking them as indicated in FIG. 5 improved performance is realized by placing a metallic non-diffusion plate between the respective subassemblies. Such a plate indicated at 26 may be also made of stainless steel from 0.002 inch to 0.006 inch in thickness and is preferably from .001″ to .002″ greater in diameter than the subassembly itself. However, the inclusion of the non-diffusion plate is entirely optional and may be omitted without serious deterioration in the performance of the thermal battery.

Single battery subassemblies 22 tested under a constant temperature of 485° C. and a load of 130 milliamperes per square centimeter at a peak voltage of 2.4 volts were found to possess a life equal to 80% of peak voltage of 70 to 100 seconds when made according to the above described process. A thermal battery was made according to this process by stacking 10 subassemblies 3/8 inch in diameter and 0.047 to 0.050 inch in thickness with the anode of one cell facing the cathode of the next as in FIG. 5. A non-diffusion plate .005 inch thick made of stainless steel separated each subassembly and the entire assembly was fitted snugly into a steel tube having a silicone impregnated glass liner. These cells were assembled in a thermal battery and tested under a load of 2.5 milliamperes; the peak voltage was 25.3 volts, life to 90% of peak voltage was 166 seconds. The battery was free of noise during the period of its useful life.

Although this invention has been described with reference to a few embodiments it should be apparent to anyone skilled in the art that it is not so limited but is susceptible of many modifications without departing from the spirit thereof. Therefore, the specification is not to be construed as limiting the invention in any manner and the scope of the invention is to be determined by the appended claim.

What is claimed as new and desired to be secured by Letters Patent of the United States is:

The method of manufacturing a thermal battery subassembly comprising stamping a conducting strip into discs connected by narrow tabs, securing to alternate discs and on opposite sides a plurality of thermal compacts and pellets respectively, the height of said compacts and pellets each being equal to the length of said tabs, severing the strip across alternate tabs adjacent the discs to leave units containing a disc supported compact, a disc supported pellet and connecting tab, folding the compact onto the pellet so that the tab lies alongside the compacts and the compact and pellet align with each other.

References Cited in the file of this patent

UNITED STATES PATENTS

| | | |
|---|---|---|
| 2,519,527 | Wilkinson | Aug. 22, 1950 |
| 2,745,894 | Nowotny | May 15, 1956 |

OTHER REFERENCES

Goodrich et al.: J. of Electrochemical Society, vol. 99, No. 8, pages 207C, 208C, August 1952.